United States Patent [19]

Normark

[11] 4,235,461
[45] Nov. 25, 1980

[54] COUPLING BETWEEN MECHANICAL ELEMENTS

[76] Inventor: Olov M. Normark, Astrakangatan 2, Vällingby, Sweden S-162 32

[21] Appl. No.: 956,430

[22] Filed: Oct. 31, 1978

[51] Int. Cl.$^2$ .............................................. F16L 17/02
[52] U.S. Cl. .................................. 285/340; 285/341; 285/348; 285/354; 285/DIG. 3
[58] Field of Search ...................... 285/382.7, 341, 340, 285/342, 343, 348, 353, 354, 356, 386, 384, DIG. 3; 403/370, 371, 372; 151/19 R, 19 A; 85/33

[56] References Cited

U.S. PATENT DOCUMENTS

| 2,313,323 | 3/1943 | Cowles | 285/341 |
| 2,333,470 | 11/1943 | Cowles | 285/341 X |
| 3,072,421 | 1/1963 | Lloyd et al. | 285/340 X |
| 3,695,640 | 10/1972 | Clague | 285/341 X |
| 3,985,379 | 10/1976 | Normork | 285/340 |

FOREIGN PATENT DOCUMENTS

| 2659185 | 7/1977 | Fed. Rep. of Germany | 285/382.7 |
| 749395 | 5/1956 | United Kingdom | 285/341 |

Primary Examiner—Dave W. Arola
Attorney, Agent, or Firm—Holman & Stern

[57] ABSTRACT

A coupling, arranged to form a frictional joint between two mechanical elements, comprising of a tubular contact member, arranged to take up a non-deformative frictional contact with an element to be attached by means of a first peripherical surface when a mainly plane spring ring, extending from the opposed peripherical surface mainly perpedicularly to the length axis of the element to be attached, is twisted or tilted by means of a manually operated force applying member to an inclined relationship to said length axis, said tubular contact member having a longitudinal section causing the applied force from the spring ring to be equally distributed over the contact surface with the element to be attached.

8 Claims, 5 Drawing Figures

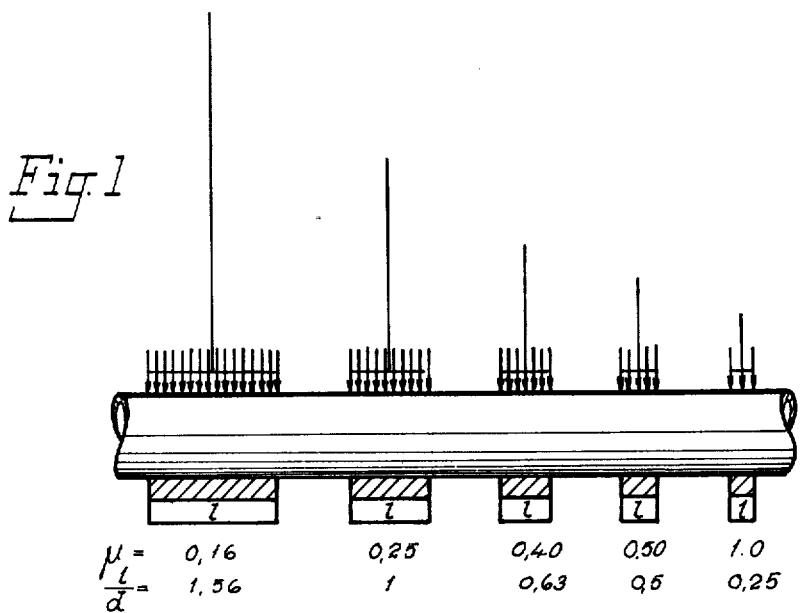

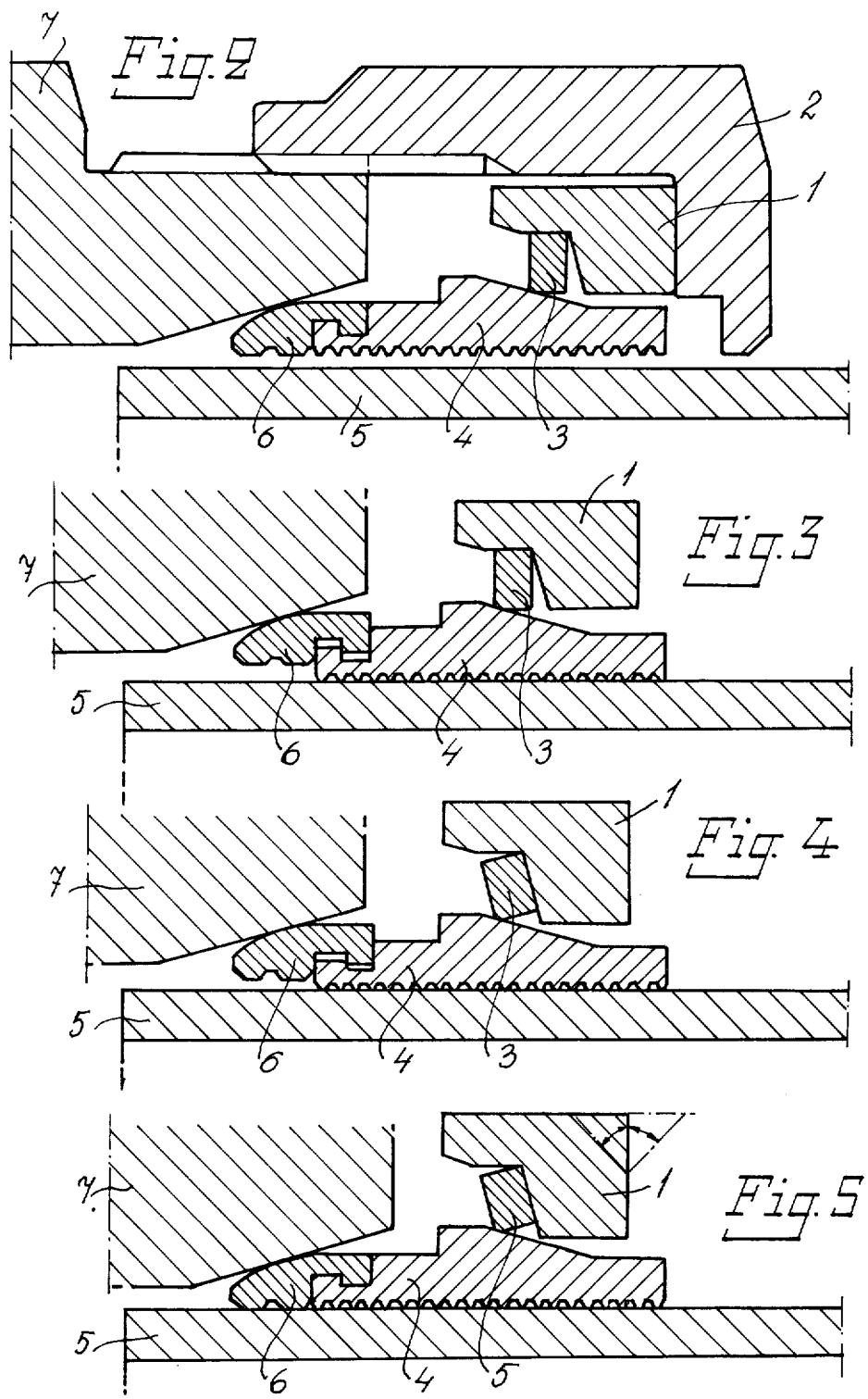

COUPLING BETWEEN MECHANICAL ELEMENTS

The present invention relates to a coupling between mechanical elements, and the term mechanical elements includes elements having a solid or tubular cross-sectional area, and also semi-solid cross-sectional area, e.g. wires or similar.

A large number of different types of couplings or joints are previously known, intended to faciliate joining of two elements, such as permanent joints, e.g. by means of welding, and also as various types of couplings and other non-permanent joints, e.g. various types of tubular couplings, axle attachments, locking means for wires, cable attachments and similar.

Permanent joints have an obvious disadvantage, since the members joined are deformed or damaged when the joint is removed. Previously known types of non-permanent couplings have also a disadvantage, since the attached members are more or less plastically and/or mechanically deformed when the joint is achieved. Said deformation causes the joint to be less resistent against vibrations and pressure and repeated assembly/disassembly can not be performed maintaining the desired properties of the joint.

The object of the present invention is to dislose an unknown development of a coupling of non-deformative type, based on the prior art previously known from Swedish Pat. No: 7201350-1 (Publication No: 372 607). Said patent discloses a coupling, in which a frusto-conical spring ring is twisted or tilted in relation to a tubular member, against which a peripherical portion of the spring ring is in contact. The spring ring acts as a force transforming means, said force being transferred by means of the tubular member to a member, intended to be attached by means of the coupling. An important and characteristic feature relating to said previously known design is thus that a frusto-conical spring ring is utilized, which is twisted or tilted to a second position, in order to achieve attachment of the element intended to be attached by means of the coupling. The tubular member, against which the spring ring is acting, is further arranged as a cylindrical tubular member, alternatively a conical tubular member, and the force applied by the spring ring is not arranged to achieve application of a similar force along all of the peripherical contact surface of the tubular member, i.e. more force is applied at the point where the spring ring is in contact with the tubular member, and a smaller force is applied at a point at a distance from said first point. A sealing effect is further achieved by utilizing two contactable conical surfaces, which causes a risk for the front end portion of the tubular member, having a sharp surrounding edge, to cut into the attached element.

The present invention is a development of the above mentioned type of coupling, intended to facilitate use of a plane spring ring in uninfluenced position, against which a force is applied from a force applying member via a support ring, whereafter the applied force is transferred to a member having a beam-shaped longitudinal section, which is arranged to apply a similar holding force along all of the internal contact surface against an element, intended to be attached. According to a preferred embodiment, attachment is performed in a number of successive spaces, with the beam-shaped member in a first stage arranged to take up contact against the element to be attached, the holding force being equally distributed along all of the contact surface, and as a second step, the beam-shaped member performs a linear movement, whereby a sealing member is forced to perform a movement in direction towards the attached element, thereby taking up contact in a sealing position between a conical surface and the peripherial surface of the attached element, thus forming a holding and sealing joint. It should be emphasized, that the method in which the holding force is equally distributed along all of the contact surface, also prevents the coupling from deforming the attached element, and no element in the coupling are deformed, i.e. repeated assembly and disassembly can be performed, maintaining good holding and sealing properties for the coupling.

The important and characteristic features of the present invention are disclosed in the following main claim, and further characteristic features are also disclosed in the sub-claims.

The principles on which the present invention is based, as well as an example of an embodiment, is more fully described below with reference to the accompanying drawings.

FIG. 1 shows schematically the relationship between friction coefficient and applied force for obtaining similar holding properties.

FIG. 2 shows an embodiment of a coupling according to the present invention, shown in an uninfluenced and not attached position.

FIG. 3 shows a longitudinal section, corresponding to FIG. 2, showing a first stage of attachment.

FIG. 4 shows a longitudinal section corresponding to FIGS. 2 and 3, showing a second stage of attachment.

FIG. 5 shows the coupling attached to an element or a detail.

With reference to FIG. 1, the relationship between friction coefficient and applied force is shown, when certain predetermined holding properties are to be achieved. It can be seen, that with a friction coefficient in the range of 1,0, which in practise means a mechanical grip between the details, the necessary force to prevent a sliding action is relatively small. By increasing the contact surface, and by maintaining the same attachment force per surface unit, corresponding properties with regard to attachment can be achieved with a friction coefficient being less than 0,2. Obviously, the total applied force in the figure, indicated as a vertical line, would be considerably larger.

The present invention is based on a force transforming mechanism, including a support ring 1, as shown in the figure arranged in contact with a force applying member, e.g. a nut 2, the linear movement when rotated being transferred via the support ring 1 to a spring ring 3, which in uninfluenced position comprises of a plane disc. Said spring ring 3 is arranged with the inside peripherical portion against a contact member 4, having a beam-shaped longitudinal section and referred to as the beam, arranged with an inclined outer contact surface co-acting with the spring ring 3. During a first stage of attachment, cf. FIG. 3, the beam 4 is brought from a first parallel position in relation to an embraced element 5 to take up light contact against same, whereby the spring ring 3 has been moved to such an axial position in relation to the beam 4 that a further sliding movement in relation to the beam 4 is impossible. During the following stage of attachment, cf. FIG. 4, the spring ring 3 is forced to take up a dished or tilted relationship to the previously mainly perpendicular position against the length axis of the embraced element 5, either inclined in the direction of movement or alternatively against said direction. The support ring 1 is preferably arranged with an internal inclined surface, against which the spring ring 3 makes face to face contact when the spring is deformed into its dished condition. As shown in FIG. 3, the beam 4 takes up complete contact with the embraced element 5, the surface pressure being equally distributed along all of the length. The beam 4 can preferably be arranged with a through groove in longitudinal direction.

For applications in which not only holding properties are desired, e.g. when also sealing properties are desired, the beam 4 is preferably joined with a nose member 6, said parts being preferably resilient and detachably joined to each other. The nose member 6 co-acts by means of an outer convex surface with an inclined surface in the body 7 to which the nut 2 is attached, and the surface contactable with the attached element 5 is preferably arranged with at least one internal groove, dividing the contact surface in at least two separate parts, the forward surface preferably being joined with a convex surface joined with the previously mentioned convex surface.

For certain applications, it is desired to improve guidance of the support ring 1 in relation to the nut 2. For these cases, the nut 2 and the support ring 1 are preferably arranged with contactable inclined surfaces, either inclined in or alternatively against the direction of movement as indicated at the support ring 1 in FIG. 5.

To utilize, in uninfluenced condition, a plane spring ring 3 together with the support ring 2, makes it possible to apply necessary force, by means of the force applying member, the nut 2, with a minimum of torque, which makes it possible to apply an equally distributed holding force along all of the surface at the beam 4 in contact with the element 5, and the beam 4 should obviously be dimensioned in such a way, that application of force at a predetermined point causes desired holding properties.

The inclined surface at the support ring 1, against which the spring ring 3 takes up contact, when tilted or twisted, makes it also possible to decide the extent of twisting or tilting, i.e. the applied force against the embraced element 5.

In embodiments, where sealing properties are not necessary, e.g. wire locks, the nose member 6 can obviously be excluded, since only holding properties are desired.

The shown and described embodiment is only intended to exemplify an embodiment, in which an axial movement is transferred to a mainly plane spring ring 3, preferably via an intermediate supporting ring 1, the spring ring 3, which is arranged in contact with an inclined surface of a in longitudinal section beam-shaped member 4, being twisted or tilted in relation to the uninfluenced position, thereby applying a force against the beam-shaped member 4, which thus takes up equal and complete contact against the element 5 intended to be attached. For applications where sealing properties are desired, a nose member 6 is detachably attached to the beam 4, which member 6 by means of a convex outer surface co-acts with an inclined surface, arranged to resiliently be compressed between said inclined surface and the embraced member 5, thus causing sealing properties.

The present invention is obviously not restricted to the above described and in the drawings shown embodiment, since obviously many modifications are possible, maintaining the important and characteristic features of the present invention.

I claim:

1. In a coupling for connecting together a pair of elongate mechanical elements, said coupling including a contact member for engaging an outer surface of one of said elements and means for applying inward radial pressure to said contact member causing said contact member to grip against said outer surface, the improvement wherein said radial pressure applying means includes a substantially planar annular spring disc having its inner periphery contacting the outer surface of said contact member and means for applying axial pressure to said disc to deform said disc from an unstressed planar condition into a stressed dished condition in which said disc applys radial pressure to said contact member, said axial pressure applying means including means defining a surface inclined relative to said disc in the unstressed planar condition of the disc and having face to face contact with said disc when said disc is deformed into said stressed dished condition.

2. The improvement of claim 1 wherein said contact member is an axially elongate member having an inclined outer surface portion, said disc being axially slidable along said surface portion up to a point on said surface portion at which axial pressure on said disc causes said disc to be deformed into said dished condition whereby radial pressure is applied to said contact member, the positioning of said point being such that said radial pressure is converted to a force substantially evenly distributed along the length of said contact member.

3. The improvement of claim 1 or claim 2 wherein said axial pressure applying means includes a support ring means having a radially extending portion defining said inclined surface and an axially extending portion extending over said disc.

4. The improvement of claim 1 or claim 2 wherein said axial force applying means includes a first ring means and a second ring means, said second ring means defining said inclined surface and being axially moveable relative to said first ring means for deforming said disc from said planar condition to said dished condition.

5. The improvement of claim 4 including a resilient member attached to one end of said contact member, said resilient member engaging the surface of said first ring means and said outer surface of said one coupling element when said disc is in said dished condition to form a seal between said one coupling element and said first ring means.

6. The improvement of claim 5 wherein said resilient member includes an inner surface for contacting said one coupling element and means defining an annular groove dividing said inner surface into separate axially extending sections.

7. The improvement of claim 4 wherein said second ring means comprises an internal ring for engaging said disc and external ring surrounding said internal ring.

8. The improvement of claim 7 wherein said external ring has a screw connection with said first ring means.

* * * * *